(12) United States Patent
Depond (10) Patent No.: US 8,367,250 B2
(45) Date of Patent: Feb. 5, 2013

(54) DEVICE FOR STORING ELECTRIC POWER COMPRISING A PROTECTIVE BARRIER LAYER FOR THE COLLECTOR

(75) Inventor: Jean-Michel Depond, Quimper (FR)

(73) Assignee: Batscap, Ergue Gaberic (FR)

( * ) Notice: Subject to any disclaimer, the term of this patent is extended or adjusted under 35 U.S.C. 154(b) by 691 days.

(21) Appl. No.: 11/992,109

(22) PCT Filed: Sep. 15, 2006

(86) PCT No.: PCT/EP2006/066420
§ 371 (c)(1),
(2), (4) Date: May 3, 2010

(87) PCT Pub. No.: WO2007/031577
PCT Pub. Date: Mar. 22, 2007

(65) Prior Publication Data
US 2010/0203393 A1    Aug. 12, 2010

(30) Foreign Application Priority Data

Sep. 15, 2005 (FR) ...................................... 05 09421

(51) Int. Cl.
*H01M 2/16* (2006.01)
*H01M 4/82* (2006.01)
*C23C 14/00* (2006.01)
*C23C 16/00* (2006.01)
*B05D 1/36* (2006.01)
*H01G 9/00* (2006.01)

(52) U.S. Cl. ............... 429/246; 204/192.15; 29/623.5; 427/255.391; 427/255.394; 427/419.7; 361/502

(58) Field of Classification Search .................. 429/246, 429/218.1, 231.5, 209, 210; 427/255.391, 427/255.394, 419.7; 156/89.15, 89.27; 419/13; 29/623.1, 623.5; 204/192.15; 361/502
See application file for complete search history.

(56) References Cited

U.S. PATENT DOCUMENTS

| 5,202,152 | A  * | 4/1993 | Giannelis et al. | ............. 427/108 |
| 5,464,706 | A  | 11/1995 | Dasgupta et al. | |
| 6,565,701 | B1 | 5/2003 | Jerabek et al. | |
| 6,982,132 | B1 * | 1/2006 | Goldner et al. | ............... 429/162 |
| 2004/0264110 | A1 | 12/2004 | Michel et al. | |
| 2005/0213286 | A1 * | 9/2005 | Michel et al. | ................. 361/508 |

FOREIGN PATENT DOCUMENTS

WO    WO 03/094183    11/2003

OTHER PUBLICATIONS

"Les traitements de surface sous vide", L. Tomasini (SOLLAC, Groupe Usinor), La Revue de Metallurgie-CIT, Apr. 2001, pp. 411-419.

* cited by examiner

*Primary Examiner* — Carlos Barcena
(74) *Attorney, Agent, or Firm* — Blakely, Sokoloff, Taylor & Zafman (57) ABSTRACT

The invention concerns a device for storing electric power and method for assembling the device. The device includes an electrode layer and a collector layer associated with the electrode layer, a barrier layer made of metal nitride, the barrier layer being interposed between the electrode layer and the collector layer. The barrier layer is adapted to prevent diffusion of ions contained in an electrolyte up to the collector layer.

11 Claims, 8 Drawing Sheets

Baseline

FIG_5

FIG_6

FIG_7

FIG_8

FIG_9

FIG_10

FIG_11

FIG_12

FIG_15

FIG_16

DEVICE FOR STORING ELECTRIC POWER COMPRISING A PROTECTIVE BARRIER LAYER FOR THE COLLECTOR

The present patent application is a non-provisional application claiming the benefit of International Application No. PCT/FR2006/066420, filed Sep. 15, 2006.

BACKGROUND OF THE INVENTION

1. Field of the Invention

The invention relates the field of electrochemical devices for storing electrical power.

In particular, it relates the batteries and the supercapacitors.

2. Description of Related Art

These devices are formed by the assembly of a plurality of electrochemical layers.

These devices generally include a multilayer unitary assembly that includes electrode layers (cathode and anode) and separation layers inserted between the electrodes. The device can also include one or more collector layers, each collector layer being in contact with certain electrode layers.

In the case of a liquid electrolyte device, the separation layer (separator) is formed from a porous material, and the different layers are impregnated with a liquid electrolyte solution.

In the case of a solid electrolyte device, the separation layer is composed of a solid electrolyte layer.

The function of the separation layer is to hold the electrode layers at a distance from each other so as to avoid a short-circuit of the electrochemical device while still allowing the establishment of an ion current between the electrode layers, through the electrolyte.

The function of each collector layer is to collect and conduct the current coming from an electrode that is associated with it.

In a storage device of the lithium-polymer battery type for example, the cathode layer(s) is (are) formed from a composition that includes a mixture of polymers and active charges. The polymer mixture typically contains a fluoridated polymer, such as polyvinylidene fluoride (PVDF) or polytetrafluoroethylene (PTFE). The active charges are composed of active charcoals or intercalation compounds of lithium for example.

The device includes one or more collector layer(s) associated with one or more cathode layer(s). The collector layer or layers are formed from metal, such as aluminium or copper.

In a supercapacitor type storage device, the electrode layer or layers are formed from a composition that includes a mixture of polymers and active charges. The polymer mixture typically contains a fluoridated polymer, such as polyvinylidene fluoride (PVDF) or the polytetrafluoroethylene (PTFE). The active charges are composed of active charcoals for example.

The device includes one or more collector layer(s) associated with one or more electrode layer(s). The collector layer or layers are formed from metal, such as aluminium or copper.

The metal collector layer or layers naturally have a tendency to former a superficial oxide film at their surface. Thus an aluminium collector layer forms a film of alumina ($Al_2O_3$) on the surface.

During the mechanical assembly of a collector layer on a cathode layer, the oxide film located at the interface between the collector layer and the cathode layer is broken.

During the operation of the electrochemical device, the ions of the electrolyte diffuse through the cathode up to the collector. The ions of the electrolyte react with the metal of the collector to form a passivation layer. Thus, the oxide film is progressively replaced or added to by the passivation layer obtained from reactions between ions contained in the electrolyte and the metal of the collector.

In the case of an aluminium collector, in the presence of fluoride (F) ions, the passivation layer typically contains aluminium fluoride ($AlF_3$) or aluminium hydroxide ($Al(OH)_3$).

In the presence of lithium ions ($Li^+$), we observe the formation of a layer of lithium oxide ($Li_2O$) or of lithium hydroxide (LiOH) as a replacement for the original oxide film.

Once formed, the passivation layer constitutes a barrier layer that prevents the diffusion of certain ions of the electrolyte up to the collector layer and thus protects the collector.

However, the formation of the passivation layer leads to consumption of the ions contained in the electrolyte and an attack on the collector layer.

In addition, in the case of a charged electrode, in the event of local rupture of the passivation layer (due to a shock or impact, a scratch or a chemical dissolution for example), the presence of graphitic charges within the electrode induces electrochemical reactions that dissolve the metal so as to bare the collector layer. These reactions can also produce potentially dangerous gas (dihydrogen in particular) by electrochemical battery-cell effect.

Finally, in the case of an aluminium collector layer and a polymer electrode layer, the presence of alumina at the surface of the collector layer leads to poor adhesion of the electrode layer onto the collector layer.

All of these phenomena can lead to complete consumption of the collector layer during the life of the power storage device and seriously damage the characteristics of the device in operation.

One aim of the invention is to preserve the collector layer during the lifetime of the electrochemical power storage device.

BRIEF SUMMARY OF THE INVENTION

This problem is solved in the context of the present invention by virtue of a power storage device that includes an electrode layer and a collector layer associated with the electrode layer, characterised in that it also includes a barrier layer formed from metallic nitride, the barrier layer being inserted between the electrode layer and the collector layer, and the barrier layer being adapted to prevent the diffusion of ions contained in an electrolyte up to the collector layer.

The barrier layer protects the collector from the reactive species present in the electrolyte.

In addition, the barrier layer plays a role of inhibitor in relation to the electrochemical reactions induced by the presence of graphitic charges in the electrode layer.

The barrier layer can advantageously have the following characteristics:

- the barrier layer is formed from titanium nitride (TiN), chromium nitride (CrN), or titanium-aluminium nitride (TiAlN),
- the barrier layer is formed from metallic nitride $MeN_x$, where Me represents a metal or several metals, and has a stoichiometry x of between 0.85 and 1.05, a grain size of between 10 and 30 nanometers, and a thickness of between 0.15 and 0.30 micrometers, the stoichiometry x being defined as the ratio of the number of nitrogen atoms (N) and the number of metal atoms (Me) contained in the barrier layer,
- the barrier layer has a columnar structure, the barrier layer is formed by reactive magnetron sputtering or by reactive evaporation by plasma-activated electron gun, the barrier layer has a granular structure, the barrier layer is formed by reactive arc evaporation or by reactive electron-gun evaporation without plasma activation.

The invention also relates to an assembly method for a power storage device that includes an electrode layer and a collector layer associated with the electrode layer, and that includes a step that consists of inserting a barrier layer, formed from metallic nitride, between the electrode layer and the collector layer, the barrier layer being adapted to prevent diffusion of ions contained in an electrolyte up to the collector layer.

The assembly method can advantageously include a preliminary step that consists to select the grain-size, thickness and stoichiometry parameters of the barrier layer according to a lifetime sought for the power storage device.

In addition, the method can advantageously have the following characteristics:

the barrier layer is formed from metallic nitride $MeN_x$, where Me is a metal or several metals, and has a stoichiometry x of between 0.85 and 1.05, a grain size of between 10 and 30 nanometers and a thickness of between 0.15 and 0.30 micrometers, the stoichiometry x being defined as the ratio between the number of nitrogen atoms (N) on the number of metal atoms (Me) contained in the barrier layer, the method includes a step that consists of forming the barrier layer by deposition onto a surface of the collector layer, the method includes a step that consists of forming the barrier layer by deposition onto a surface of the electrode layer, the method includes a preliminary step that consists of scouring a surface of the collector layer intended to be in contact with the barrier layer, the method includes a step that consists to form the barrier layer by reactive magnetron sputtering, by reactive evaporation by plasma-activated electron gun, by reactive arc evaporation or by reactive electron-gun evaporation without plasma activation or indeed by any other method allowing to have a barrier layer with the selected parameters.

BRIEF DESCRIPTION OF THE DRAWINGS

Other characteristics and advantages will emerge from the description that follows, which is purely illustrative and non-limiting, and should be read with reference to the attached figures, in which.

DETAILED DESCRIPTION OF THE INVENTION

Figure 1:
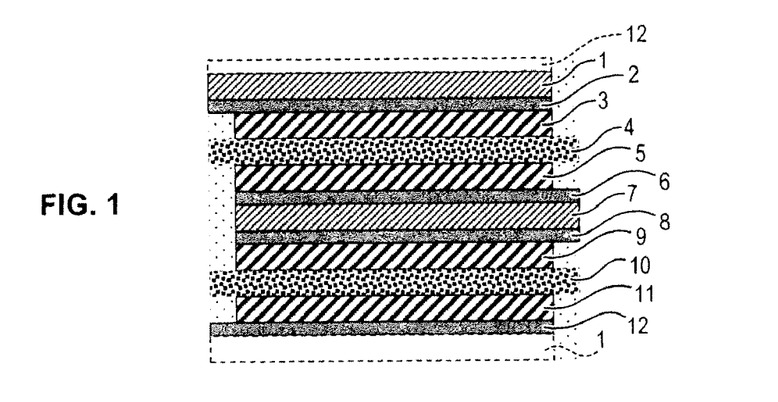
FIG. 1 schematically represents a multilayer unitary assembly in an electrochemical electric power storage device according to a first embodiment of the invention, FIG. 2 schematically represents a multilayer unitary assembly in an electrochemical electric power storage device according to a second embodiment of the invention, FIGS. 3 and 4 schematically represent structures of barrier layers, FIG. 5 schematically represents a surface profile of the collector layer.

In a first embodiment, an electrochemical power storage device is formed by superimposition of a plurality of multilayer unitary assemblies in accordance with that represented in FIG. 1. This first embodiment is typical of a supercapacitor structure.

The device can be created by rolling the multilayer unitary assembly or by stacking a plurality of multilayer unitary assemblies. The assembly thus has a repetitive form determined by the unitary assembly represented in FIG. 1.

The multilayer unitary assembly includes a first collector layer 1, a first barrier layer 2, a first electrode layer 3, a first separation layer 4, a second electrode layer 5, a second barrier layer 6, a second collector layer 7, a third barrier layer 8, a third electrode layer 9, a second separation layer 10, a fourth electrode layer 11 and a fourth barrier layer 12. The electrochemical device also includes a liquid electrolyte 13.

The first collector layer 1 is associated with the first electrode layer 3 and with a fourth electrode layer 11 of an adjacent unitary assembly. In other words, the first collector layer 1 is in electrical contact with the first electrode layer 3 and the fourth electrode layer 11 of the adjacent assembly in order to collect the current coming from the first electrode layer 3 and from the fourth electrode layer 11 of the adjacent assembly.

The first barrier layer 2 is inserted between the first collector layer 1 and the first electrode layer 3. The first barrier layer 2 is electrically conducting (i.e. the barrier layer 2 is adapted to conduct the electrons), so that the first collector layer 1 and the first electrode layer 3 are in electrical contact by means of the barrier layer 2.

The first separation layer 4 is a porous layer that lies between the two electrode layers 3, 5. The separation layer 4 and the electrode layers 3, 5 are impregnated with the liquid electrolyte 13. The separation layer is used to hold the first electrode layer 3 and the second electrode layer (5) at a distance from each other, while still allowing circulation of the ions of the electrolyte 13 between the two electrodes.

The second collector layer 7 is associated firstly with the second electrode layer 5 and secondly with the third electrode layer. In other words, the second collector layer 7 is in electrical contact with the second and third electrode layers 5, 9 in order to collect the current coming from the second and third electrode layers 5, 9.

The second barrier layer 6 is inserted between the second collector layer 7 and the second electrode layer 5. The second barrier layer 6 is electrically conducting, so that the second collector layer 7 and the second electrode layer 5 are in electrical contact by means of barrier layer 6.

The third barrier layer 8 is inserted between the second collector layer 7 and the third electrode layer 9. The third barrier layer 8 is electrically conducting, so that the second collector layer 7 and the third electrode layer 9 are in electrical contact by means of barrier layer 8.

The second separation layer 10 lies between the two electrode layers 9, 11. The separation layer 10 and the electrode layers 9, 11 are impregnated with the liquid electrolyte 13. The separation layer is used to hold the third electrode layer 9 and the fourth electrode layer 11 at a distance from each other, while still allowing circulation of the ions of the electrolyte 13 between the two electrodes.

The fourth barrier layer 12 is inserted between the fourth electrode layer 11 and a first collector layer 1 of an adjacent unitary assembly (represented by broken lines). The fourth barrier layer 12 is electrically conducting, so that the fourth electrode layer 11 and the first collector layer 1 are in electrical contact by means of barrier layer 12.

Electrode layers 3, 5, 9, and 11 are formed from a composition that includes a mixture of polymers and active charges.

Collector layers 1 and 7 are formed from aluminium.

The liquid electrolyte 13 is an electrolyte with a viscosity of the order of 0.5 to 1.5 centistokes ($10^{-6}$ square meters per second) at 25 degrees Celsius. The liquid electrolyte 13 includes a composition formed for example from acetonitrile, γ-butyrolactone, propylene carbonate or from a mixture of these compounds, or indeed from water and a conducting salt, such as tetra-ethyl-ammonium-tetra-fluoroborate (($CH_2H_5)_4$ $NBF_4$) for example.

Barrier layers 2, 6, 8 and 12 are formed from titanium nitride ($TiN_x$). Each barrier layer 2, 6, 8, 12 has a stoichiometry $x \geq 0.97$ and a dense morphological structure, i.e. with no intrinsic porosity. The stoichiometry of the barrier layers 2, 6, 8, 12 is used to guarantee the neutrality of each barrier layer 2, 6, 8, 12 in relation to the aggressive reactive species (like $BF_4^-$, $F^-$, $OH^-$, $H^+$, $H_2O$, or HCN for example) that are naturally present at the interfaces between collector layers 1 or 7 and the associated electrode layers 3, 5, 9, and 11.

Figure 2:
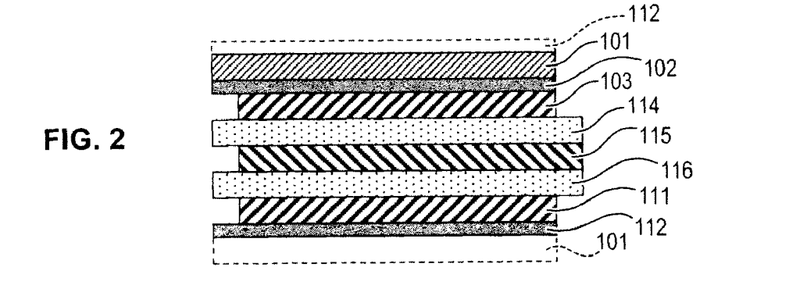

According to a second embodiment, an electrochemical power storage device is formed by superimposition of a plurality of multi-layer unitary assemblies in accordance with that represented in FIG. 2. This second embodiment is typical of a lithium-polymer battery structure.

The device can be created by rolling the multilayer unitary assembly or by stacking a plurality of multilayer unitary assemblies. The assembly thus has a repetitive form determined by the unitary assembly represented in FIG. 2.

The multilayer unitary assembly is formed by stacking a plurality of layers. The stack includes a collector layer 111, a first barrier layer 102, a first electrode layer 103 (cathode), a first solid electrolyte layer 114, a second electrode layer 115 (anode), a second solid electrolyte layer 116, a third electrode layer 111 (cathode), a second barrier layer 112.

Each of the cathode layers 103, 111 is associated with a collector layer.

The first electrode layer 103 is associated with collector layer 101, and the third electrode layer 111 is associated with collector layer 101 of an adjacent unitary assembly (represented by broken lines).

The first barrier layer 102 is inserted between the first collector layer 101 and the first electrode layer 103. The first barrier layer 102 is electrically conducting (i.e. the barrier layer 102 is adapted to conduct the electrons), so that the first collector layer 1 and the first electrode layer 103 are in electrical contact by means of the barrier layer 102.

The second barrier layer 112 is inserted between the second electrode layer 111 and the collector layer 101 of the adjacent unitary assembly. The second barrier layer 112 is electrically conducting, so that the second electrode layer 111 and the collector layer 1 are in electrical contact by means of barrier layer 112.

It be noted that the anode layer 115 is not associated with a collector layer. The anode layer 115 itself performs a current collection function.

The electrolyte layers 114, 116 are formed from a solid electrolyte with a viscosity of the order of 3 to centistokes ($10^6$ square meters per second) at 25 degrees Celsius. The solid electrolyte includes a composition formed from polyoxyethylene (POE) or polyethylene glycol (PEG) for example, and a conducting salt such as lithium bis-(trifluoromethyl-sulfonil)-imide (LiTFSi).

Figure 3:
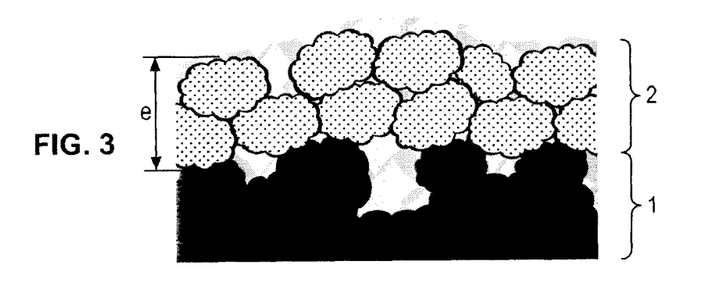
Figure 4:
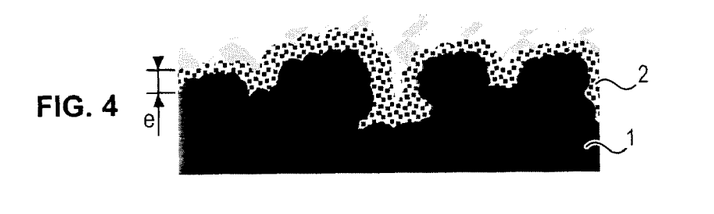

FIGS. 3 and 4 schematically represent structures of protective layers deposited onto a substrate.

In these figures, a protective layer 2 has been deposited onto the surface of a substrate layer 1.

As can be seen in FIG. 3, layer 2 is formed from grains with average dimensions that are substantially equal to or greater than the dimensions of the grains forming the substrate layer 1.

In FIG. 4, a layer 2 is formed from grains with average dimensions that are much smaller than the dimensions of the grains forming the substrate layer 1.

Total and continuous coverage of the substrate surface requires that the average grain size of the protective layer should be less than the roughness of the substrate layer surface.

In fact, if the grain size of the layer 2 is of the order of the roughness of the substrate layer 1 (in FIG. 3), then a large part of the surface of the substrate will not be covered by the layer 2. Moreover, the layer 2 will be mechanically fragile and more easily porous. In a liquid electrolyte medium (typically in the case of a supercapacitor), the interstices between the grains will be filled with electrolyte. In any case, the protective layer 2 will not perform a barrier function in relation to the substrate layer.

On the other hand, if the grain size of the layer 2 is very much less than the roughness of the substrate layer (FIG. 4), then the surface of the substrate layer will be entirely carpeted by the protective layer 2. The protective layer 2 will be mechanically attached to the collector layer 1, which is naturally dense, and will be able to perform a barrier function.

Figure 5:
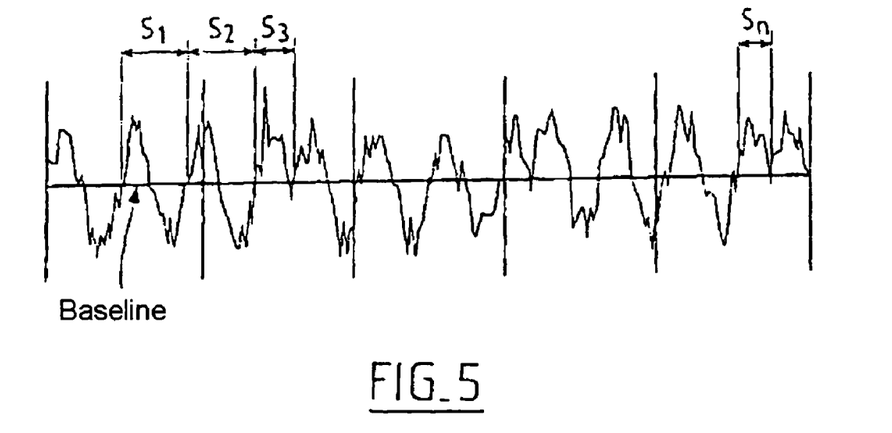

FIG. 5 represents a surface profile of the substrate layer.

The profile line is formed from a succession of peaks and valleys.

The baseline is the average straight line of the profile line.

The arithmetic mean difference $R_a$ is the arithmetic mean of the absolute values of the differences between the apexes of the peaks or the valleys and the baseline.

The standard deviation $R_q$ is the quadratic mean of the differences between the apexes of the peaks or the valleys and the baseline.

Apart from the conventional roughness characteristics ($R_a$, $R_q$) that inform on the vertical component of the roughness of a surface, we also define two characteristic magnitudes of the horizontal component of the roughness of a surface.

The mean distance between two consecutive upward crossings of the baseline, denoted $S_m$, is determined from a roughness profile.

$$Sm = \frac{1}{N}\sum_{i=1}^{N} S_i$$

$S_m$ indicates the mean width of the valleys of the surface or an average grain size.

The mean quadratic slope, denoted $\Delta_q$, is the quadratic mean of the slope of the roughness profile.

The mean quadratic wavelength, denoted $\lambda_q$, is determined from the mean quadratic roughness magnitudes $R_q$ and mean quadratic slope $\Delta_q$ $$\lambda q = 2\pi \frac{R_q}{\Delta_q}$$

$\lambda_q$ indicates the periodicity of the surface roughness.

Thus, as illustrated in FIG. 4, the barrier layer 2 preferably has an average grain size of the order of 40 times less than $S_m$ or $\lambda_q$, which are parameters characterising the horizontal component of the roughness of the substrate layer surface.

When this condition is satisfied, the barrier layer can be deposited on any substrate morphology (smooth, rough, striated, etched by chemical action or by electronic, ionic, or granular bombardment, etc.).

EXAMPLES 1 TO 12

We create a plurality of supercapacitors with liquid electrolyte (viscosity $\leq 2$ centistokes at 25 degrees Celsius).

Each supercapacitor includes a barrier layer formed from titanium nitride ($TiN_x$). The barrier layer has an average grain size, a thickness and a given stoichiometry.

A stoichiometry x is defined as the ratio of the number of nitrogen atoms (N) to the number of titanium atoms (Ti) contained in the barrier layer.

We measure the lifetime of the resulting supercapacitor.

For a supercapacitor, a lifetime n corresponds to powering for n hours at 70 degrees Celsius at a voltage of between 2.3 and 2.8 volts.

It is considered that the supercapacitor has reached the end of its life when it has lost 20% of its original capacity.

The results are presented in table 1.

TABLE 1

Lifetime of a supercapacitor with liquid electrolyte according to the parameters of the barrier layer (grain size, thickness and stoichiometry)

|  | Grain size (nm) | Thickness (µm) | Stoichiometry x | Lifetime n |
| --- | --- | --- | --- | --- |
| Example 1 | 40 ± 5 | 0.23 | 0.80 | 125 |
| Example 2 | 40 ± 5 | 0.25 | 0.95 | 300 |
| Example 3 | 40 ± 5 | 0.35 | 0.95 | 600 |
| Example 4 | 30 ± 5 | 0.21 | 0.77 | 200 |
| Example 5 | 30 ± 5 | 0.08 | 0.95 | 300 |
| Example 6 | 30 ± 5 | 0.20 | 0.99 | 1000 |
| Example 7 | 30 ± 5 | 0.30 | 0.85 | 1000 |
| Example 8 | 30 ± 5 | 0.39 | 0.96 | 3000 |
| Example 9 | 20 ± 5 | 0.08 | 0.97 | 600 |
| Example 10 | 20 ± 5 | 0.16 | 0.83 | 900 |
| Example 11 | 20 ± 5 | 0.15 | 0.95 | 1200 |
| Example 12 | 20 ± 5 | 0.23 | 0.99 | 2100 |

FIGS. 6 to 14 are diagrams representing the parameters of a barrier layer (stoichiometry, density and thickness) for different lifetimes of supercapacitors.

Figure 6:
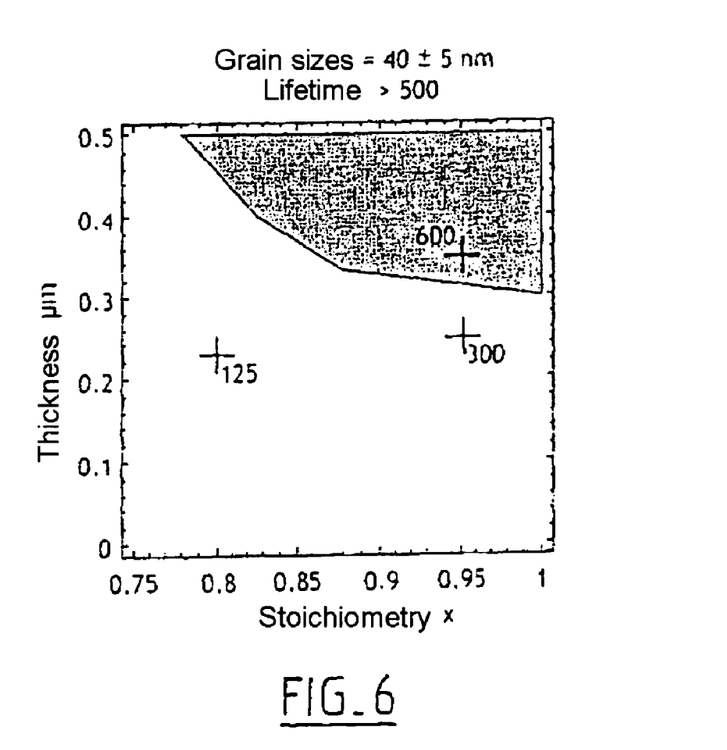
FIGS. 6 to 14 are diagrams representing the parameters of a collector layer (stoichiometry, density, thickness) for different lifetimes of the electrochemical power storage device with liquid electrolyte.
Figure 7:
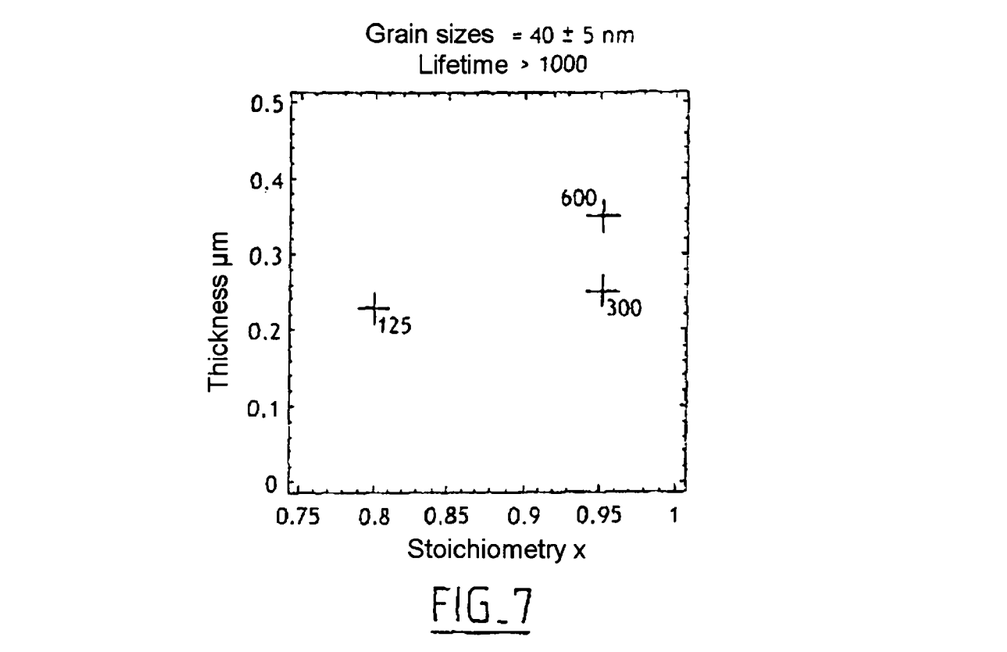
Figure 8:
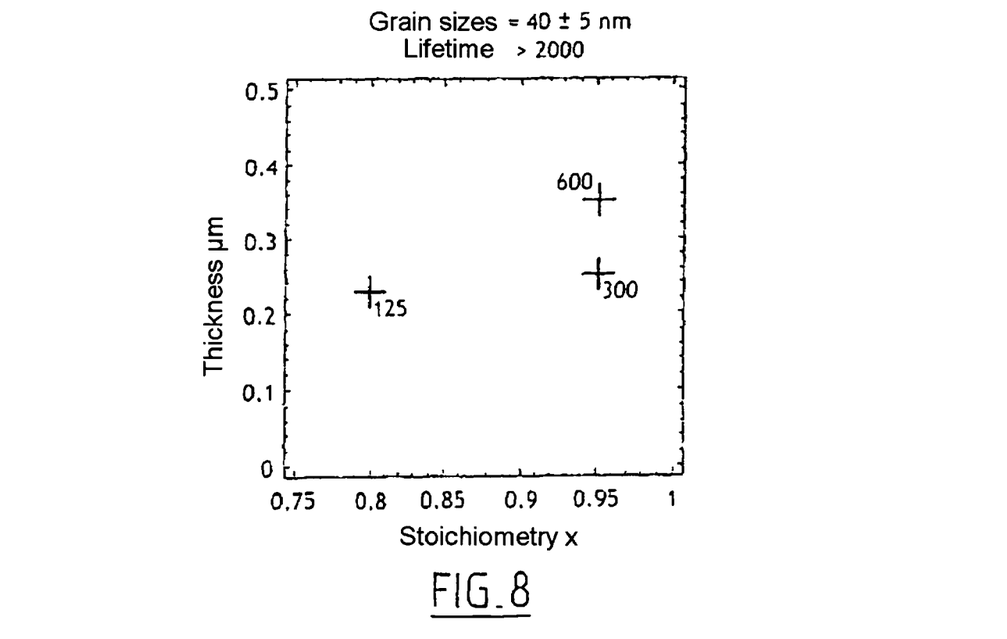

The diagrams of FIGS. 6 to 8 were prepared for a grain size of 40±5 nanometers. Examples 1, 2 and 3 have been represented in these diagrams.

In the diagram of FIG. 6, the greyed zone corresponds to a lifetime of greater than 500.

In the diagram of FIG. 7, the greyed zone corresponds to a lifetime of greater than 1000.

In the diagram of FIG. 8, the greyed zone corresponds to a lifetime of greater than 2000.

Figure 9:
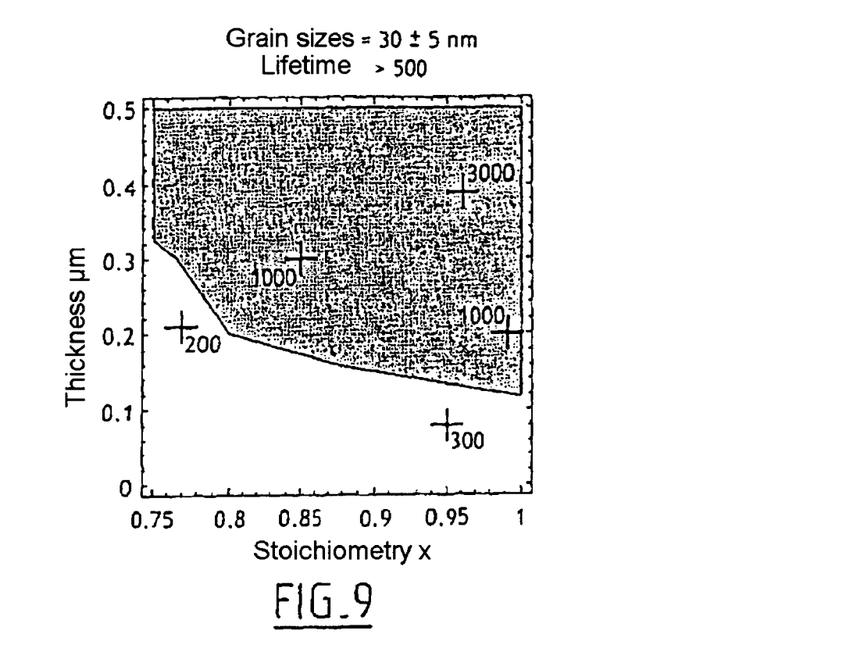
Figure 10:
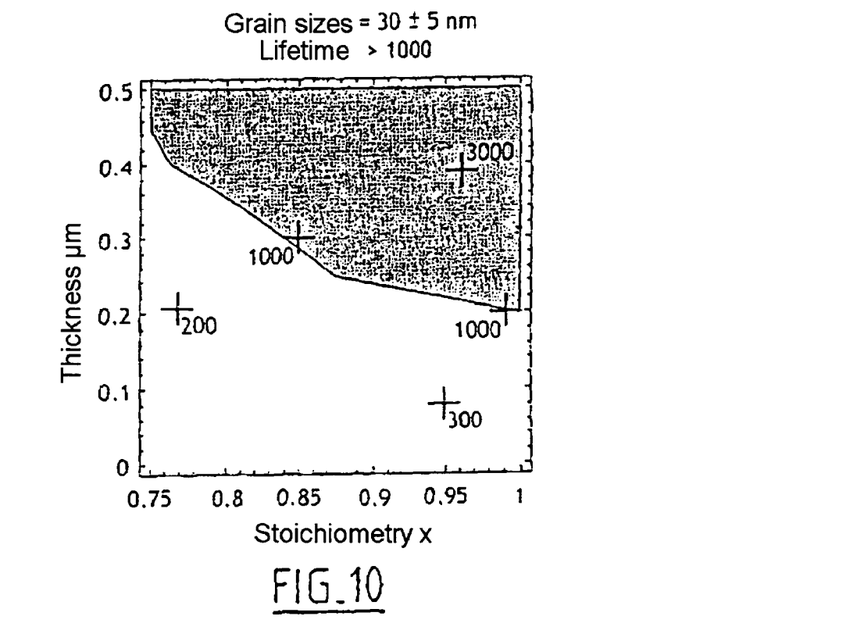
Figure 11:
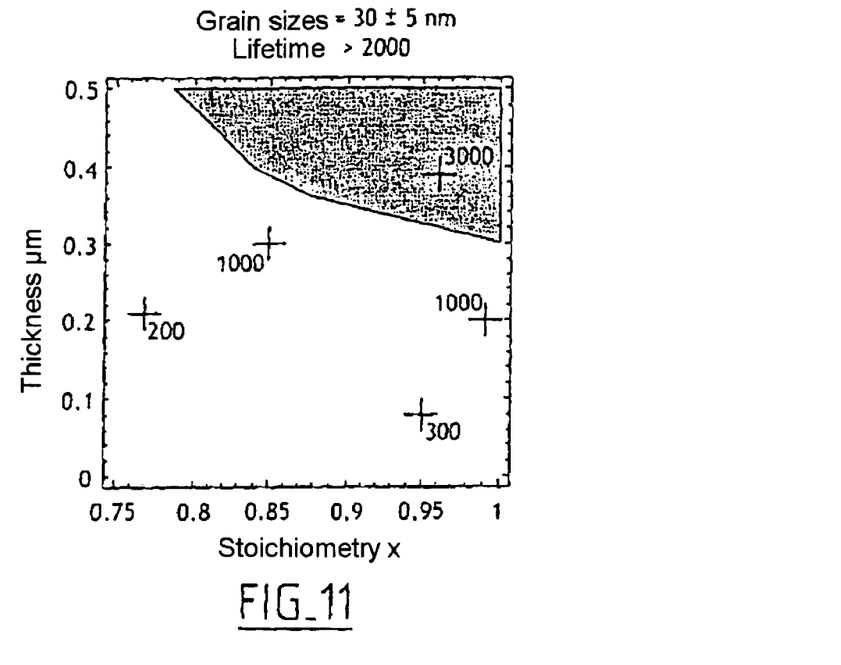

FIGS. 9 to 11 have been prepared for a grain size of 30±5 nanometers. Examples 3, 4, 5, 6, 7 and 8 have been represented in these diagrams.

In the diagram of FIG. 9, the greyed zone corresponds to a lifetime of greater than 500.

In the diagram of FIG. 10, the greyed zone corresponds to a lifetime of greater than 1000.

In the diagram of FIG. 11, the greyed zone corresponds to a lifetime of greater than 2000.

Figure 12:
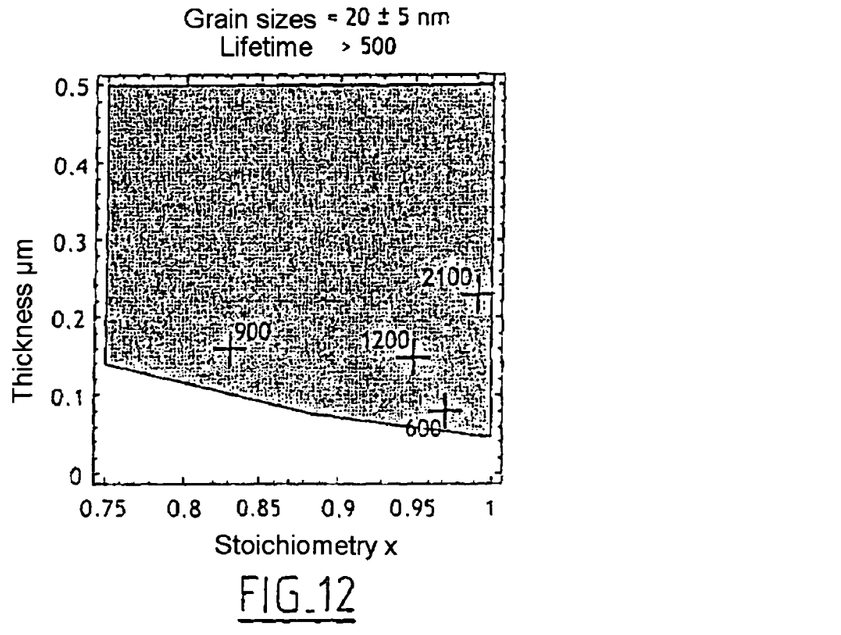
Figure 13:
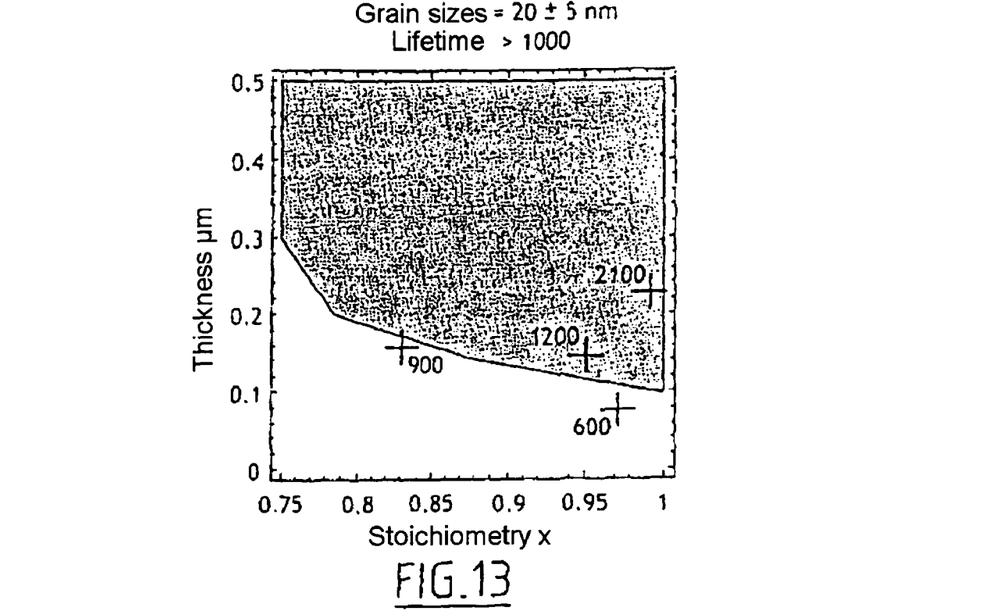
Figure 14:
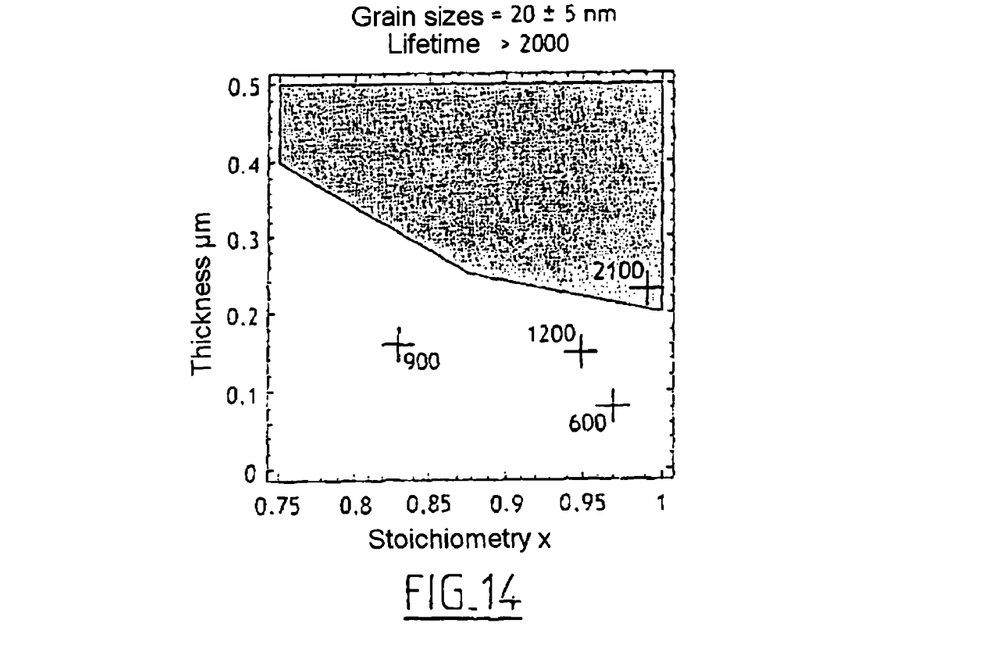

FIGS. 12 to 14 have been prepared for a grain size of 20±5 nanometers. Examples 9, 10, 11 and 12 have been represented in these diagrams.

In the diagram of FIG. 12, the greyed zone corresponds to a lifetime of greater than 500.

In the diagram of FIG. 13, the greyed zone corresponds to a lifetime of greater than 1000.

In the diagram of FIG. 14, the greyed zone corresponds to a lifetime of greater than 2000.

EXAMPLES 13 TO 24

We create a plurality of lithium-polymer batteries with solid electrolyte (viscosity >2) centistokes at 25 degrees Celsius).

Each battery includes a barrier layer formed from titanium nitride ($TiN_x$). The barrier layer has an average grain size, a thickness and a given stoichiometry.

A stoichiometry x is defined as the ratio of the number of nitrogen atoms (N) to the number of titanium atoms (Ti) contained in the barrier layer.

We measure the lifetime of the resulting battery.

For a given battery, a lifetime n corresponds to n charge/discharge cycles between 2 volts and 3.3 volts at 90 degrees Celsius (working temperature of the battery), the charge phase having a duration of 4 hours and the discharge phase having a duration of 2 hours.

It is considered that the battery has reached the end of its life when the battery has lost 20% of its original capacity.

The results are presented in table 2.

TABLE 2

Lifetime of a battery with solid electrolyte according to the parameters of the barrier layer (grain size, thickness, stoichiometry)

|  | Grain size (nm) | Thickness (µm) | Stoichiometry x | Lifetime n |
| --- | --- | --- | --- | --- |
| Example 13 | 40 ± 5 | 0.23 | 0.80 | 1100 |
| Example 14 | 40 ± 5 | 0.25 | 0.95 | 1200 |
| Example 15 | 40 ± 5 | 0.35 | 0.95 | 1350 |
| Example 16 | 30 ± 5 | 0.21 | 0.77 | 950 |
| Example 17 | 30 ± 5 | 0.08 | 0.95 | 400 |
| Example 18 | 30 ± 5 | 0.20 | 0.99 | 1200 |
| Example 19 | 30 ± 5 | 0.30 | 0.85 | 1100 |
| Example 20 | 30 ± 5 | 0.39 | 0.96 | 1300 |
| Example 21 | 20 ± 5 | 0.08 | 0.97 | 550 |
| Example 22 | 20 ± 5 | 0.16 | 0.83 | 1050 |
| Example 23 | 20 ± 5 | 0.15 | 0.95 | 1100 |
| Example 24 | 20 ± 5 | 0.23 | 0.99 | 1200 |

Figure 15:
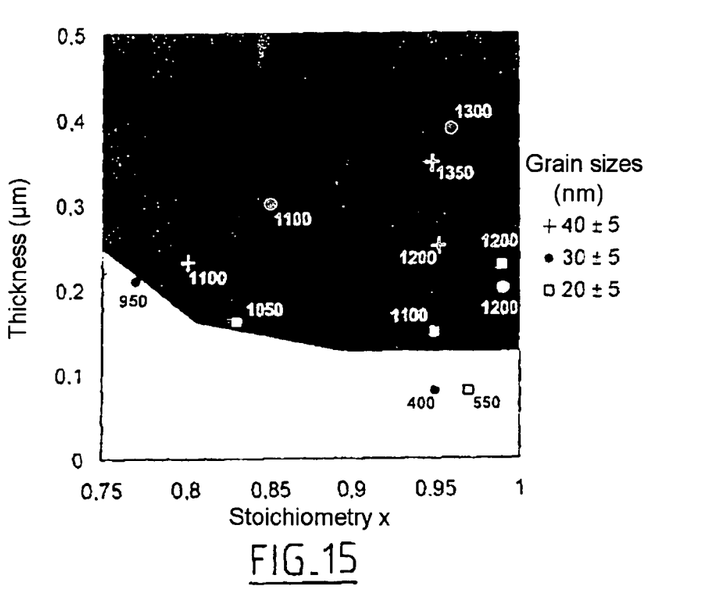
FIG. 15 is a diagram representing the parameters of a collector layer (stoichiometry, density, thickness) for different lifetimes of the electrochemical power storage device with solid electrolyte, FIG. 16 schematically represents steps of an assembly method for an electrochemical device according to one embodiment of the invention.

FIG. 15 is a diagram representing the parameters of a barrier layer (stoichiometry, density, thickness) for different battery lifetimes. This diagram has been prepared for grain sizes of 20±5 nanometers, 30±5 nanometers and 40±5 nanometers. Examples 13 to 24 have been represented in this diagram.

In this diagram, the zone represented in black corresponds to a lifetime of equal to or greater than 1000.

It will be noted that in the case of a power storage device with solid electrolyte, the average size of the grains of the barrier layer has little influence on the lifetime of the power storage device.

Figure 16:
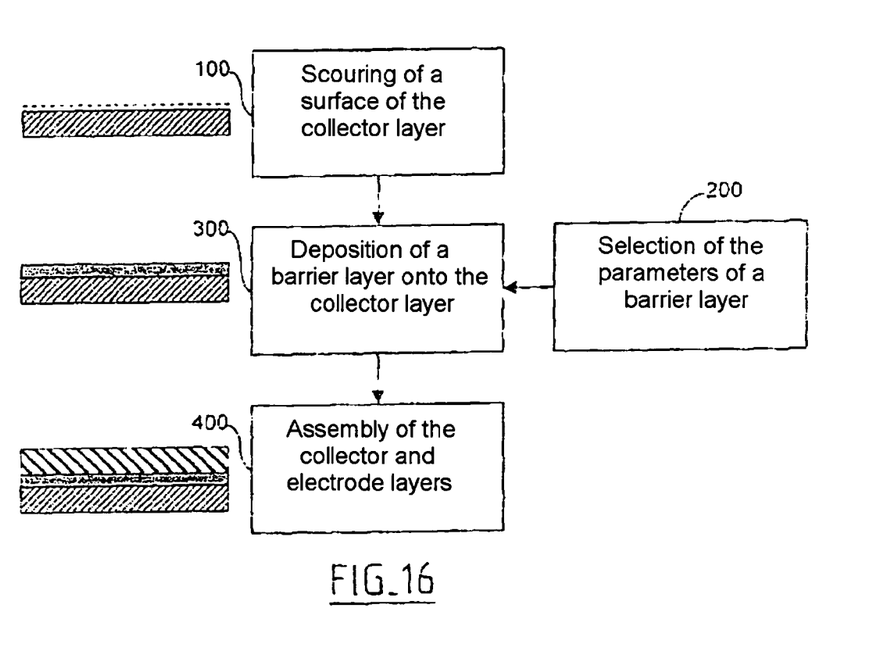

FIG. 16 schematically represents steps of an assembly method for an electrochemical device according to one embodiment of the invention.

According to a first step 100, we scour a surface of the collector layer 1. This scouring step consists of removing a superficial film of oxides and of surface deposits (grease, hydrocarbons, etc.) present on the surface of the collector layer 1.

This first scouring step is made, for example, by a technique of treatment or ionic bombardment by plasma. The gas used is argon (but may possibly contain dihydrogen $H_2$ or ammoniac $NH_3$). The working pressure is between $10^{-1}$ and $10^{-3}$ millibars. The power of the plasma generator is between 1 and 10 kilowatts and the duration of the treatment is of the order of 10 to 30 seconds.

According to a second step 200, we select parameters (grain size, thickness, stoichiometry) of a barrier layer in accordance with a looked-for lifetime.

During this step, reference should be made to the diagrams of FIGS. 6 to 14 or to the diagram of FIG. 15.

According to a third step 300, we deposit onto the scoured surface of the collector layer 1 a barrier layer 2 with a controlled grain size, thickness and stoichiometry.

According to one option, this third step is made by a technique of deposition by plasma-assisted electron-gun evaporation. The deposition is made at a working pressure of between $10^{-2}$ and $10^{-4}$ millibar, with an electron-gun power of between and 75 kilowatts, the substrate (collector) being held at a temperature of less than 100 degrees Celsius, with a gas flow (dinitrogen $N_2$) of between 10 and 104 sccm (standard cubic centimeters per minute).

According to another option, this third step is made by a technique of deposition by evaporation by arc. The deposition is made at a working pressure of between $10^{-2}$ and $10^{-4}$ millibar, with a power from the arc generator of between 25 and 75 kilowatts, the substrate (collector) being held at a temperature of less than 100 degrees Celsius, with a gas flow (dinitrogen $N_2$) of between 10 and 104 sccm (standard cubic centimeters per minute).

According to another option yet, this third step is made by a technique of deposition by reactive magnetron sputtering. The deposition is made at a working pressure of between $10^{-2}$ and $10^{-4}$ millibar, with a power from the reactive magnetron generator of between 5 and 30 kilowatts, the substrate (collector) being held at a temperature of less than 100 degrees Celsius, with a gas flow (dinitrogen $N_2$) of between 10 and 104 sccm (standard cubic centimeters per minute).

According to a fourth step 400, we assemble an electrode layer 3 and the associated collector layer 1 so that the barrier layer 2 lies between the electrode layer 3 and the collector layer 1.

In the assembly method has just been described, a barrier layer is deposited onto a surface of a collector layer.

In the case of a power storage device with solid electrolyte, the barrier layer could be deposited onto an electrode layer.

In this case, during the third step 300, we can deposit the barrier layer 2 with a controlled grain size, a thickness and a stoichiometry, onto a surface of the electrode layer 3.

According to one option, this third step is made by a technique of deposition by reactive magnetron sputtering. The deposition is made at a working pressure of between $10^{-2}$ and $10^{-4}$ millibar, at a power of between 0.5 and 5 kilowatts, the substrate (electrode) being held at a temperature of less than 25 degrees Celsius, and a gas flow (dinitrogen $N_2$) of between 1 and 103 sccm (standard cubic centimeters per minute).

Figure 17:
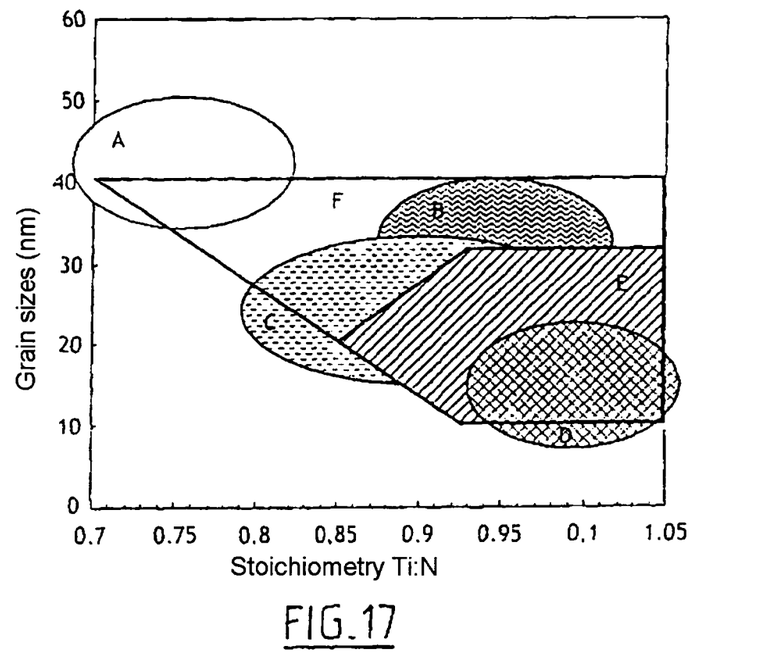
FIG. 17 is a diagram that schematically represents techniques for deposition of the barrier layer according to the stoichiometry parameter and the grain size of the barrier layer.

FIG. 17 is a diagram that schematically represents techniques for deposition of the barrier layer according to the stoichiometry parameter and grain size of the barrier layer.

The techniques of deposition by reactive evaporation by electron gun (domain A) are suitable to obtain a stoichiometry x of between 0.7 and 0.8 and a grain size of between 40 and 50 nanometers.

The techniques of deposition by reactive evaporations by arc (domain B) are suitable to obtain a stoichiometry x of between 0.9 and 1 and a grain size of between 30 and 40 nanometers.

The techniques of deposition by plasma-assisted reactive electron-gun evaporation (domain C) are suitable to obtain a stoichiometry x of between 0.8 and 1 and a grain size of between 20 and 30 nanometers.

The techniques of deposition by reactive magnetron sputtering (domain D) are suitable to obtain a stoichiometry x of between 0.95 and 1.05 and a grain size of between 10 and 20 nanometers.

For a lifetime of a power storage device with liquid electrolyte in a standard application of the continuous powering type (lifetime of n=1000), the power storage device includes a barrier layer whose parameters are defined by domain E. The domain E corresponds to a stoichiometry of between 0.85 and 1.05 and a grain size of between 10 and 30 nanometers.

For a lifetime of a power storage device with solid electrolyte in a standard application of the electric vehicle type (lifetime of n=1000), the power storage device includes a barrier layer whose parameters are defined by the F field. The domain E corresponds to a stoichiometry of between 0.75 and 1.05 and to a grain size of between 10 and 40 nanometers.

Figure 18:
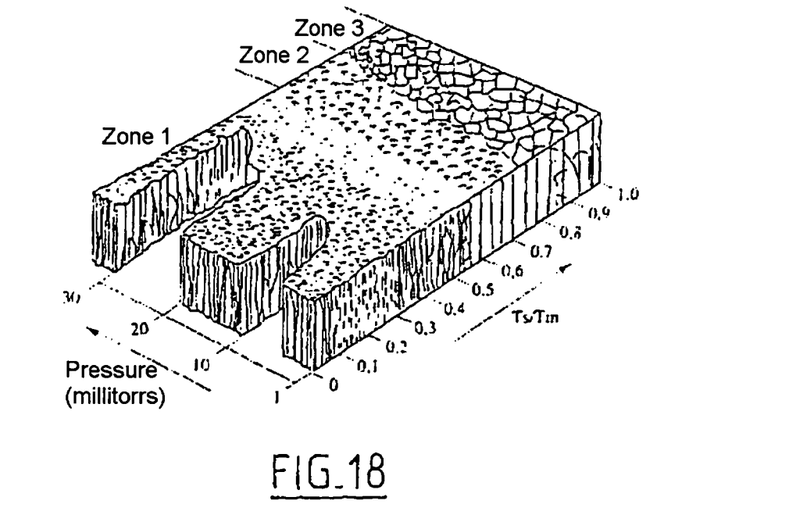
FIG. 18 is a diagram that schematically represents a collector layer structure according to the deposition conditions.

FIG. 18 is a diagram that schematically represents a barrier layer structure according to the deposition conditions. $T_s$ refers to the temperature of the substrate (collector layer) and $T_m$ refers to the melting temperature of the deposited material (barrier layer).

The diagram includes a first zone (Zone 1) in which the structure of the deposited material is granular and porous, a second zone (Zone 2) in which the structure of the deposited material is columnar and a third zone (Zone 3) in which the structure of the deposited material is crystalline.

The deposition morphology offering the highest density is obtained by crystalline growth (Zone 3). However such a growth is not possible since the substrate (the collector or the electrode) is polycrystalline and rough.

By default, the deposition morphology most likely to satisfy the density requirement is obtained by columnar growth (Zone 2). This type of growth is observed in the case of deposition by reactive magnetron sputtering and in certain configurations of deposition by reactive evaporation by plasma-activated electron gun.

A deposition morphology being also suitable to satisfy the density requirement is obtained by granular growth (Zone 1). This type of growth is observed in the case of deposition by reactive arc evaporation or by reactive electron-gun evaporation without plasma activation. However, the layers obtained are naturally porous and the density requirement can be satisfied only if the grain size is very small (apparent diameter less than 20 nanometers measured by atomic force microscopy for example), which has that one is working at very low pressures (<10 milliTorrs) that are difficult to attain, since the nitriding reaction requires the presence of a dinitrogen stream ($N_2$).

A dense deposition morphology can be achieved only if the oxides and hydroxides on the surface of the substrate (alumina and aluminium hydroxide for an aluminium-based collector for example, or copper oxides $CuO_x$ for a copper-based collector for example) are eliminated before the deposition proper. The scouring step 100 of the surface of the collector is then necessary before the creation of the metallic nitride based barrier layer.

The invention claimed is:

1. A power storage device including an electrode layer (3, 5, 9, 11) and a collector layer (1, 7) associated with the electrode layer, comprising:
    a barrier layer (2, 6, 8, 12) formed from a metallic nitride, the barrier layer (2, 6, 8, 12) being inserted between the electrode layer (3, 5, 9, 11) and the collector layer (1, 7), the barrier layer (2, 6, 8, 12) being adapted to prevent diffusion of ions contained in an electrolyte (13, 14, 16) up to the collector layer (1, 7),
    wherein the barrier layer (2, 6, 8, 12) formed from metallic nitride $MeN_x$, in which Me is at least one metal, has a stoichiometry x of between 0.85 and 1.05, a grain size of between 10 and 30 nanometers, and a thickness of between 0.15 and 0.30 micrometers.

2. The device according to claim 1, wherein the barrier layer (2, 6, 8, 12) is formed from titanium nitride (TiN), chromium nitride (CrN) or titanium nitride-aluminium (TiAlN).

3. The device according to claim 1, wherein the barrier layer (2, 6, 8, 12) has a columnar structure.

4. The device according to claim 3, wherein the barrier layer (2, 6, 8, 12) is formed by reactive magnetron sputtering or by reactive evaporation by plasma-activated electron gun.

5. The device according to claim 1, wherein the barrier layer (2, 6, 8, 12) has a granular structure.

6. The device according to claim 5, wherein the barrier layer is formed by reactive arc evaporation or by reactive electron-gun evaporation without plasma activation.

7. A method for a power storage device assembly including an electrode layer (3, 5, 9, 11) and a collector layer (1, 7) associated with the electrode layer (3, 5, 9, 11), comprising:
    selecting grain-size, thickness and stoichiometry parameters of a barrier layer (2, 6, 8, 12) in accordance with a lifetime sought for the power storage device,
    inserting the barrier layer (2, 6, 8, 12), formed from metallic nitride, between the electrode layer (3, 5, 9, 11) and the collector layer (1, 7), the barrier layer (2, 6, 8, 12) being adapted to prevent diffusion of ions contained in an electrolyte (13, 14, 16) up to the collector layer (1, 7),
    wherein the barrier layer (2, 6, 8, 12) is formed from metallic nitride $MeN_x$, in which Me is one or more metals, has a stoichiometry x of between 0.85 and 1.05, a grain size of between 10 and 30 nanometers, and a thickness of between 0.15 and 0.30 micrometers.

8. The method according to claim 7, further comprising forming the barrier layer (2, 6, 8, 12) by deposition onto a surface of the collector layer (1, 7).

9. The method according to claim 7, further comprising forming the barrier layer (2, 6, 8, 12) by deposition onto a surface of the electrode layer (3, 5, 9, 11).

10. The method according to claim 7, further comprising a preliminary step (100) of scouring a surface of the collector layer (1, 7) intended to be in contact with the barrier layer (2, 6, 8, 12).

11. The method according to claim 7, further comprising forming the barrier layer (2, 6, 8, 12) by reactive magnetron sputtering, by reactive evaporation by plasma-activated electron gun, by reactive arc evaporation or by reactive electron-gun evaporation without plasma activation.

* * * * *

UNITED STATES PATENT AND TRADEMARK OFFICE
CERTIFICATE OF CORRECTION

PATENT NO. : 8,367,250 B2  
APPLICATION NO. : 11/992109  
DATED : February 5, 2013  
INVENTOR(S) : Jean-Michel Depond Page 1 of 1

It is certified that error appears in the above-identified patent and that said Letters Patent is hereby corrected as shown below:

In the Specification:

Column 5, line 48, please delete "collector layer 111" and insert --collector layer 101--.

Column 6, line 4, please delete "It be noted" and insert --It will be noted--.

Signed and Sealed this  
Twenty-sixth Day of November, 2013

Margaret A. Focarino  
*Commissioner for Patents of the United States Patent and Trademark Office*